(12) United States Patent
Adamczyk et al.

(10) Patent No.: US 10,608,434 B2
(45) Date of Patent: Mar. 31, 2020

(54) POWER TRANSMISSION NETWORK

(71) Applicant: General Electric Technology GmbH, Baden (CH)

(72) Inventors: Andrzej Adamczyk, Stafford (GB); Carl David Barker, Stone (GB); Robert Stephen Whitehouse, Stafford (GB)

(73) Assignee: General Electric Technology GmbH, Baden (CH)

( * ) Notice: Subject to any disclaimer, the term of this patent is extended or adjusted under 35 U.S.C. 154(b) by 149 days.

(21) Appl. No.: 15/559,633

(22) PCT Filed: Mar. 17, 2016

(86) PCT No.: PCT/EP2016/055885
§ 371 (c)(1),
(2) Date: Sep. 19, 2017

(87) PCT Pub. No.: WO2016/146784
PCT Pub. Date: Sep. 22, 2016

(65) Prior Publication Data
US 2018/0342871 A1 Nov. 29, 2018

(30) Foreign Application Priority Data
Mar. 19, 2015 (EP) .................................. 15275080

(51) Int. Cl.
*H02J 3/18* (2006.01)
*H02J 3/36* (2006.01)
(Continued)

(52) U.S. Cl.
CPC .................. *H02J 3/18* (2013.01); *H02J 3/24* (2013.01); *H02J 3/36* (2013.01); *H02J 3/38* (2013.01);
(Continued)

(58) Field of Classification Search
CPC ........ H02M 1/02; H02M 1/42; H02M 1/4208; H02M 1/4216; H02M 1/4233; H02M 5/40;
(Continued)

(56) References Cited

U.S. PATENT DOCUMENTS

2007/0121353 A1* 5/2007 Zhang .................... H02M 1/12
363/39
2009/0322083 A1 12/2009 Wagoner et al.
(Continued)

FOREIGN PATENT DOCUMENTS

EP 2 846 451 A1 3/2015
WO 2014/108258 A2 7/2014

OTHER PUBLICATIONS

International Search Report and Written Opinion issued in connection with corresponding PCT Application No. PCT/EP2016/055885 dated May 25, 2016.
(Continued)

*Primary Examiner* — Alex Torres-Rivera
(74) *Attorney, Agent, or Firm* — Eversheds Sutherland (US) LLP

(57) ABSTRACT

A power transmission network including: a variable power source; an AC transmission link for AC power transmission from the variable power source to at least one source side converter; at least one source side converter including: an AC connecting point operably connected to the AC transmission link; and a DC connecting point for connection to a DC transmission link; and a control system configured to operate the source side converter or at least one of the source side converters in a frequency damping mode to control an AC voltage at its AC connecting point and thereby damp at least one frequency component at its AC connecting point and/or in the AC transmission link.

21 Claims, 8 Drawing Sheets

(51) Int. Cl.
*H02J 3/38* (2006.01)
*H02J 3/24* (2006.01)
*H02M 7/757* (2006.01)
*H02M 1/00* (2006.01)
*H02M 7/797* (2006.01)

(52) U.S. Cl.
CPC ...... *H02J 2003/365* (2013.01); *H02M 7/7575* (2013.01); *H02M 7/797* (2013.01); *H02M 2001/0025* (2013.01); *Y02E 60/60* (2013.01)

(58) Field of Classification Search
CPC ................ H02M 5/42; H02M 7/7575; H02M 2001/0025; H02M 7/797; Y02E 40/00; Y02E 40/10; Y02E 40/12; Y02E 40/74; Y02E 60/60; H02J 3/18; H02J 3/24; H02J 3/38; H02J 3/36; H02J 2003/365
See application file for complete search history.

(56) References Cited

U.S. PATENT DOCUMENTS

| | | | |
|---|---|---|---|
| 2012/0155125 A1* | 6/2012 | Zhang | H02M 1/44 363/34 |
| 2015/0249413 A1* | 9/2015 | Ren | H02P 9/007 290/44 |
| 2015/0263637 A1* | 9/2015 | Wu | H02M 5/458 363/36 |
| 2015/0333648 A1* | 11/2015 | Son | H02J 3/36 363/35 |
| 2016/0134114 A1* | 5/2016 | Gupta | H02M 7/44 307/82 |
| 2017/0054301 A1* | 2/2017 | Fintzos | H02J 3/386 |
| 2017/0250540 A1* | 8/2017 | Varma | H02M 7/44 |

OTHER PUBLICATIONS

Extended European Search Report and Opinion issued in connection with corresponding EP Application No. 15275080.8 dated Aug. 25, 2015.

* cited by examiner

POWER TRANSMISSION NETWORK

FIELD OF INVENTION

Embodiments of the invention relate to a power transmission network and, in particular, a high voltage power transmission network.

BACKGROUND OF THE INVENTION

The connection of a variable power source to a power grid can lead to the introduction of unwanted power changes resulting from the variability in generated power. Such variability in generated power may arise due to the intermittent nature of renewable energy resources, such as wind, tidal and solar farms. These power changes may lead to grid instability and thereby affect the quality of the transmitted power in the power grid, which has economic implications for the power supplier and the end user.

SUMMARY OF INVENTION

According to a first aspect of embodiments of the invention, there is provided a power transmission network comprising: a variable power source; an AC transmission link for AC power transmission from the variable power source to at least one source side converter; at least one source side converter including: an AC connecting point operably connected to the AC transmission link; and a DC connecting point for connection to a DC transmission link; and a control system configured to operate the source side converter or at least one of the source side converters in a frequency damping mode to control an AC voltage at its AC connecting point and thereby damp at least one frequency component at its AC connecting point and/or in the AC transmission link.

It will be understood that control of the AC voltage at the AC connecting point may be a direct result of the control of the AC voltage at the AC connecting point or be an indirect result of the control of another AC voltage at another point in the power transmission network.

A variable power source may be any power source, such as an intermittent energy source, that is capable of generating a variable power. Examples of an intermittent energy source include, but are not limited to, a wind farm, a tidal farm and a solar farm.

The frequency characteristic(s) of the variable power source may differ from that of the or each source side converter. A difference in frequency characteristic(s) between the variable power source and the or each source side converter may arise as a result of, for example, the application of different control strategies in operating the variable power source and the or each source side converter. In addition, since the variable power source and the or each source side converter may be manufactured and supplied independently of each other, the controllers for the variable power source and the or each source side converter may be designed independently of each other, thus potentially resulting in a difference in frequency characteristic(s) between the variable power source and the or each source side converter.

During operation of the power transmission network, the relative electrical proximity between the variable power source and the or each source side converter allows a frequency component generated by the variable power source to influence the or each source side converter, and a frequency component generated by the or each source side converter to influence the variable power source. This means that generation of an undesirable frequency by the variable power source could lead to destabilisation of the operation of the or each source side converter, and generation of an undesirable frequency by the or each source side converter could lead to destabilisation of the operation of the variable power source, thus adversely affecting the stability of the power transmission network.

In addition, during the operation of the power transmission network, the interaction between the or each source side converter and the AC transmission link allows a frequency component generated by the or each source side converter to influence the AC transmission link, and the AC transmission link has a frequency-dependent impedance characteristic that may include peaks and troughs representing resonances that can be excited by an active element, such as the or each source side converter or the variable power source. This means that generation of an undesirable frequency by the or each source side converter could lead to destabilisation of the operation of the AC transmission link, and excitation of the resonances that characterise the AC transmission link impedance could result in generation of an undesirable frequency, thus adversely affecting the stability of the power transmission network.

The inclusion of the control system in the power transmission network according to embodiments of the invention permits control of the source side converter or at least one of the source side converters to damp at least one frequency component at the AC connecting point of the source side converter or at least one of the source side converters and/or in the AC transmission link and thereby permits damping of at least one undesirable frequency that could destabilise the operation of the variable power source and/or the or each source side converter.

The ability of the control system to operate the or each source side converter in a frequency damping mode to damp at least one frequency component at the AC connecting point of the source side converter or at least one of the source side converters and/or in the AC transmission link therefore results in a more reliable power transmission network.

An alternative solution might be to control the variable power source to provide a damping power across a desired range of frequencies. The complexity of a variable power source's control characteristic(s) however means that it can be difficult to modify the variable power source's control characteristic(s) to provide the necessary damping power across the desired range of frequencies, especially when the variable power source includes a plurality of electrical elements.

The ability of the control system to operate the source side converter or at least one of the source side converters in a frequency damping mode to damp at least one frequency component at the AC connecting point of the source side converter or at least one of the source side converters and/or in the AC transmission link may be limited by the bandwidth of the control system (which includes the bandwidth of its components). This prevents operation of the source side converter or at least one of the source side converters to damp a frequency component outside the bandwidth of the control system. On the other hand the source side converter or at least one of the source side converters would not be susceptible to any frequency component outside the bandwidth of the control system, and hence its operation would not be influenced by a frequency component outside the bandwidth of the control system.

During operation of the power transmission network, a variation in power generated by the connected variable power source may arise. This may be due to, for example, the intermittent nature of a renewable energy resource such as a wind, tidal or solar farm.

For economic reasons, instead of controlling the amount of power generated by the variable power source, the power transmission network is configured to accommodate the variation in power generated by the variable power source, thereby transmitting all of the power generated by the variable power source to the or each source side converter.

For example, the control system may be configured to operate the source side converter or at least one of the source side converters in an AC voltage control mode as an AC slack bus to control a magnitude and/or frequency of an AC voltage of the AC transmission link at a respective steady-state value and thereby facilitate variation of a power transfer between its AC and DC connecting points to accommodate a variation in power generated by the variable power source. Operation of the source side converter or at least one of the source side converters in the AC voltage control mode facilitates generation of a stable AC voltage waveform in the AC transmission link and thereby allows the variable power source to synchronise to the stable AC voltage waveform. Such synchronisation ensures that any power generated by the variable power source will be accommodated by the source side converter or at least one of the source side converters and thereby injected into the DC transmission link.

In embodiments of the invention the control system may be configured to operate the source side converter or at least one of the source side converters in an AC voltage control mode as an AC slack bus to control a magnitude and/or a frequency of an AC voltage of the AC transmission link at a respective steady-state value and thereby facilitate variation of a power transfer between its AC and DC connecting points so as to accommodate a variation in power generated by the variable power source, and the control system is further configured to operate the source side converter or at least one of the source side converters in the frequency damping mode during its operation in the AC voltage control mode. Configuration of the control system in this manner enables damping of at least one frequency component to provide stable power transmission in the power transmission network during the operation of the source side converter or at least one of the source side converters in the AC voltage control mode to accommodate a variation in power generated by the variable power source.

Damping of at least one frequency component may be carried out in different ways. Damping at least one frequency component may include minimising, cancelling and/or inhibiting generation of at least one frequency component.

The method of damping of a respective frequency component may be selected depending on the origin and properties of the or each frequency component.

The or each frequency component may be generated by the source side converter or at least one of the source side converters; the excitation of a resonance of a frequency-dependent impedance characteristic of the AC transmission link; or the variable power source. The or each frequency component may be a frequency component of: a respective power oscillation between the source side converter or at least one of the source side converters and the variable power source; a respective power oscillation between the AC transmission link and the source side converter or at least one of the source side converters; or a respective power oscillation between two or more of a plurality of electrical elements of the variable power source.

In embodiments of the invention the control system may be configured to passively and/or actively modify a magnitude reference value for an AC voltage of the AC transmission link, a frequency reference value for an AC voltage of the AC transmission link and/or a respective converter AC voltage reference value for an AC voltage of the source side converter or at least one of the source side converters, and to operate the source side converter or at least one of the source side converters in the frequency damping mode in accordance with the or each modified reference value.

The control system may be configured to filter at least one signal corresponding to an electrical characteristic of the power transmission network so as to attenuate one or more frequency components in the or each signal to provide a respective filtered reference value, and to operate the source side converter or at least one of the source side converters in the frequency damping mode in accordance with the or each filtered reference value. The or each signal may correspond to, for example, a reference value of the power transmission network, a measured value of the power transmission network or an error signal between reference and measured values of the power transmission network For example, the or each signal corresponding to an electrical characteristic of the power transmission network may be selected from a group including: the measured AC voltage magnitude or frequency of the power transmission network; an error signal between the magnitude reference value and a measured AC voltage magnitude of the AC transmission link; an error signal between the frequency reference value and a measured AC voltage frequency of the AC transmission link; an error signal between the alternating current reference value and a measured alternating current of the AC transmission link; the respective converter AC voltage reference value.

The control system may include one or more filters tuned to at least one predefined frequency to filter the at least one signal corresponding to an electrical characteristic of the power transmission network so as to attenuate one or more frequency components in the or each signal to provide the or each filtered reference value.

The configuration of the control system in this manner enables attenuation of one or more predefined frequencies in the AC voltage at the AC connecting point of the source side converter or at least one of the source side converters by inhibiting generation of at least one frequency component by the source side converter or at least one of the source side converters that could adversely impact the operation of the variable power source.

The control system may be configured to modulate the magnitude reference value and/or the frequency reference value, and to operate the source side converter or at least one of the source side converters in the frequency damping mode in accordance with the or each modulated reference value. The control system may be configured to modulate the magnitude reference value and/or the frequency reference value, and to operate the source side converter or at least one of the source side converters in the frequency damping mode in accordance with the or each modulated reference value and thereby inject at least one additional frequency component into its AC connecting point and/or the AC transmission link.

The configuration of the control system to modulate the magnitude reference value and/or the frequency reference value enables operation of the source side converter or at least one of the source side converters to provide an active damping power at one or more predefined frequencies to damp at least one frequency component at the AC connecting point of the source side converter or at least one of the source side converters and/or in the AC transmission link. In this manner the or each source converter can be operated to provide the active damping power to provide stable power transmission in the power transmission network.

The power transmission network may be configured in various ways to fulfill specific power transmission requirements.

In embodiments of the invention the power transmission network may include: an AC transmission link for AC power transmission from the variable power source to a source side converter; a source side converter including: a DC connecting point for connection to a DC transmission link; and an AC connecting point operably connected to the AC transmission link.

In use, the DC connecting point of the source side converter is operably connected to a DC transmission link for DC power transmission between a network side converter and a source side converter, and a network side converter includes: a DC connecting point operably connected to the DC transmission link; and an AC connecting point operably connected to an AC electrical network.

In this manner the power transmission network according to embodiments of the invention is configured in use as a point-to-point power transmission network.

In other embodiments of the invention the power transmission network may include: an AC transmission link for AC power transmission from the variable power source to a plurality of source side converters; a plurality of source side converters, each source side converter including: a DC connecting point for connection to a respective one of a plurality of DC transmission links; and an AC connecting point operably connected to the AC transmission link.

In use, the DC connecting point of each source side converter is operably connected to a respective one of a plurality of DC transmission links, each of which is for DC power transmission between a network side converter and a source side converter, and each of a plurality of network side converters includes: a DC connecting point operably connected to a respective one of the DC transmission links; and an AC connecting point operably connected to a respective AC electrical network.

In this manner the power transmission network according to embodiments of the invention is configured in use as a multiple point-to-point power transmission network.

The control system may be configured to operate at least one source side converter in an AC voltage control mode as an AC slack bus to control a magnitude of an AC voltage of the AC transmission link at a steady-state value and to operate at least one other source side converter in an AC voltage control mode as an AC slack bus to control a frequency of an AC voltage of the AC transmission link at a steady-state value, and thereby facilitate variation of a power transfer between the AC and DC connecting points of each source side converter to accommodate a variation in power generated by the variable power source.

The control system may be configured to operate at least one source side converter in an AC voltage control mode as an AC slack bus to control a magnitude and frequency of an AC voltage of the AC transmission link at a respective steady-state value and thereby facilitate variation of a power transfer between its AC and DC connecting points to accommodate a variation in power generated by the variable power source.

In other words, at least one source side converter may be operated to control the magnitude of the AC voltage of the AC transmission link while at least one other second converter may be operated to control the frequency of the AC voltage of the AC transmission link and/or at least one source side converter may be operated to control both the magnitude and frequency of the AC voltage of the AC transmission link.

The control system may be configured to operate the source side converter or the at least one source side converter in the frequency damping mode and as an active and/or reactive power sink or source.

In embodiments of the invention the control system may be configured to passively and/or actively modify an active power reference value for an active power of the AC transmission link and/or an reactive power reference value for a reactive power of the AC transmission link, and to operate the source side converter or at least one of the source side converters in the frequency damping mode in accordance with the or each modified reference value.

The control system may be configured to filter at least one signal corresponding to an active or reactive power characteristic of the power transmission network so as to attenuate one or more frequency components in the or each signal to provide respective filtered reference value, and to operate the source side converter or at least one of the source side converters in the frequency damping mode in accordance with the or each filtered reference value. The or each signal may correspond to, for example, a reference active or reactive power value of the power transmission network, a measured active or reactive power value of the power transmission network or an error signal between reference and measured active or reactive power values of the power transmission network The or each signal corresponding to an active or reactive power characteristic of the power transmission network may be selected from a group including: an error signal between the active power reference value and a measured active power of the AC transmission link; an error signal between the reactive power reference value and a measured reactive power of the AC transmission link.

The control system may include one or more filters tuned to at least one predefined frequency to filter at least one signal corresponding to an active or reactive power characteristic of the power transmission network so as to attenuate one or more frequency components in the or each signal to provide a respective filtered reference value.

The control system may be configured to modulate the active power reference value and/or the reactive power reference value, and to operate the source side converter or at least one of the source side converters in the frequency damping mode in accordance with the or each modulated reference value. The control system may be configured to modulate the active power reference value and/or the reactive power reference value, and to operate the source side converter or at least one of the source side converters in the frequency damping mode in accordance with the or each modulated reference value and thereby inject at least one additional frequency component into its AC connecting point and/or the AC transmission link.

The configuration of the control system to modulate the active power reference value and/or the reactive power reference value enables operation of the source side converter or at least one of the source side converters to provide an active damping power at one or more predefined frequencies to damp at least one frequency component at the AC connecting point of the source side converter or at least one of the source side converters and/or in the AC transmission link. In this manner the or each source converter can be operated to provide the active damping power to provide stable power transmission in the power transmission network.

The control system may be configured to: operate at least one first source side converter to operate in an AC voltage control mode as an AC slack bus to control a magnitude and/or frequency of an AC voltage of the AC transmission link at a steady-state value, and thereby facilitate variation of a power transfer between the AC and DC connecting points of each source side converter to accommodate a variation in power generated by the variable power source; operate at least one second source side converter as an active and/or reactive power sink or source; and operate the or each first source side converter and/or the or each second source side converter in the frequency damping mode.

The control system may be configured to receive and process at least one electrical measurement of the power transmission network so as to provide at least one modulating signal, the control system being further configured to process the or each modulating signal to modulate the or each reference value as a function of the or each received electrical measurement.

When the control system includes a cascaded control loop, the control system may be configured to process the or each modulating signal in an inner control loop of the cascaded control loop. This allows the required damping to be provided in the event an outer loop of the cascaded control loop does not have sufficient bandwidth to allow processing of the or each modulating signal to provide the required damping.

The configuration of the control system may vary depending on specific requirements of the power transmission network. For example, the control system may include a global controller for controlling a plurality of converters, at least one local controller for controlling at least one converter, or a combination thereof. The global controller may be located remotely from each converter and may be configured to communicate with each converter via telecommunications links. The or each local controller may be located in the vicinity of at least one converter. The global controller may be configured to communicate with at least one local controller via telecommunications links.

According to a second aspect of the invention, there is provided a method of damping at least one frequency component in a power transmission network, the power transmission network comprising: a variable power source; an AC transmission link for AC power transmission from the variable power source to at least one source side converter; and at least one source side converter including: an AC connecting point operably connected to the AC transmission link; and a DC connecting point for connection to a DC transmission link, wherein the method comprises the step of operating the source side converter or at least one of the source side converters in a frequency damping mode to control an AC voltage at its AC connecting point and thereby damp at least one frequency component at its AC connecting point and/or in the AC transmission link.

The advantages of the second aspect of the invention are described above with respect to the first aspect of the invention.

BRIEF DESCRIPTION OF THE DRAWINGS

Embodiments of the invention will now be described, by way of non-limiting examples only, with reference to the accompanying drawings in which.

DETAILED DESCRIPTION

Figure 1:
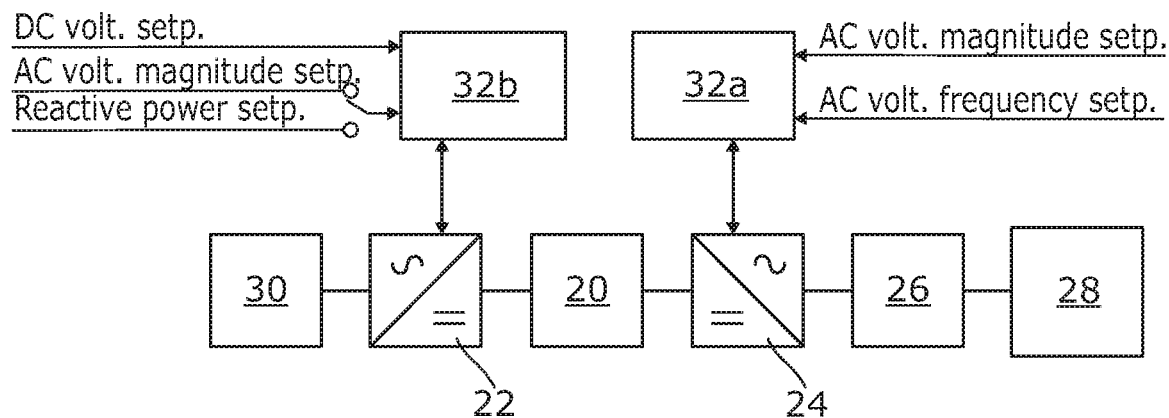
FIG. 1 shows, in schematic form, a power transmission network.

A first power transmission network according to a first embodiment of the invention is shown in FIG. 1.

The first power transmission network comprises: a DC transmission link 20 for DC power transmission between a network side converter 22 and a source side converter 24; an AC transmission link 26 for AC power transmission from a wind farm 28 to a source side converter 24; a wind farm 28; a source side converter 24 including: a DC connecting point connected to a first end of the DC transmission link 20; and an AC connecting point operably connected to the AC transmission link 26; a network side converter 22 including: an AC connecting point for connection to an AC power grid 30; and a DC connecting point connected to a second end to the DC transmission link 20.

In this manner the first power transmission network is configured as a point-to-point power transmission network for interconnecting the wind farm 28 and the AC power grid 30.

Figure 2A:
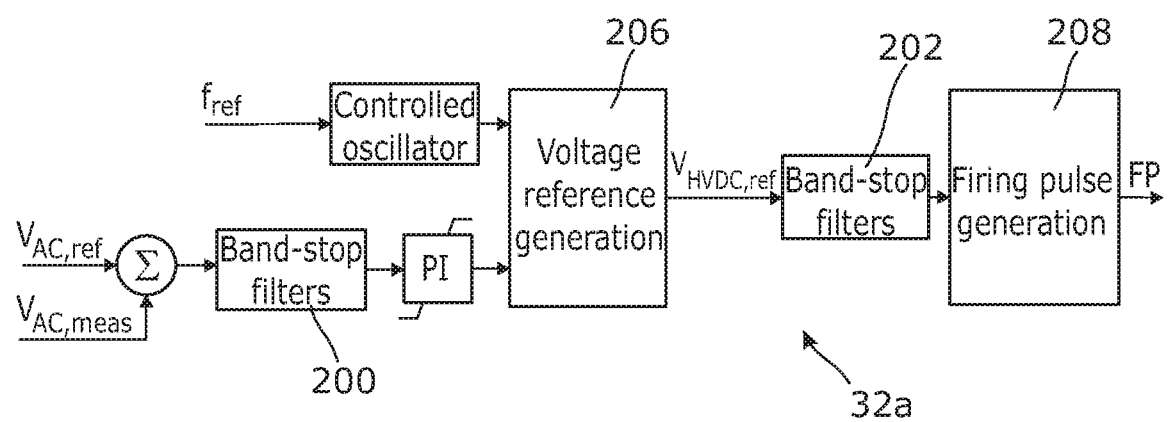
FIGS. 2A, 2B and 2C respectively show, in schematic form, variations of a first local controller of the power transmission network of FIG. 1.
Figure 2B:
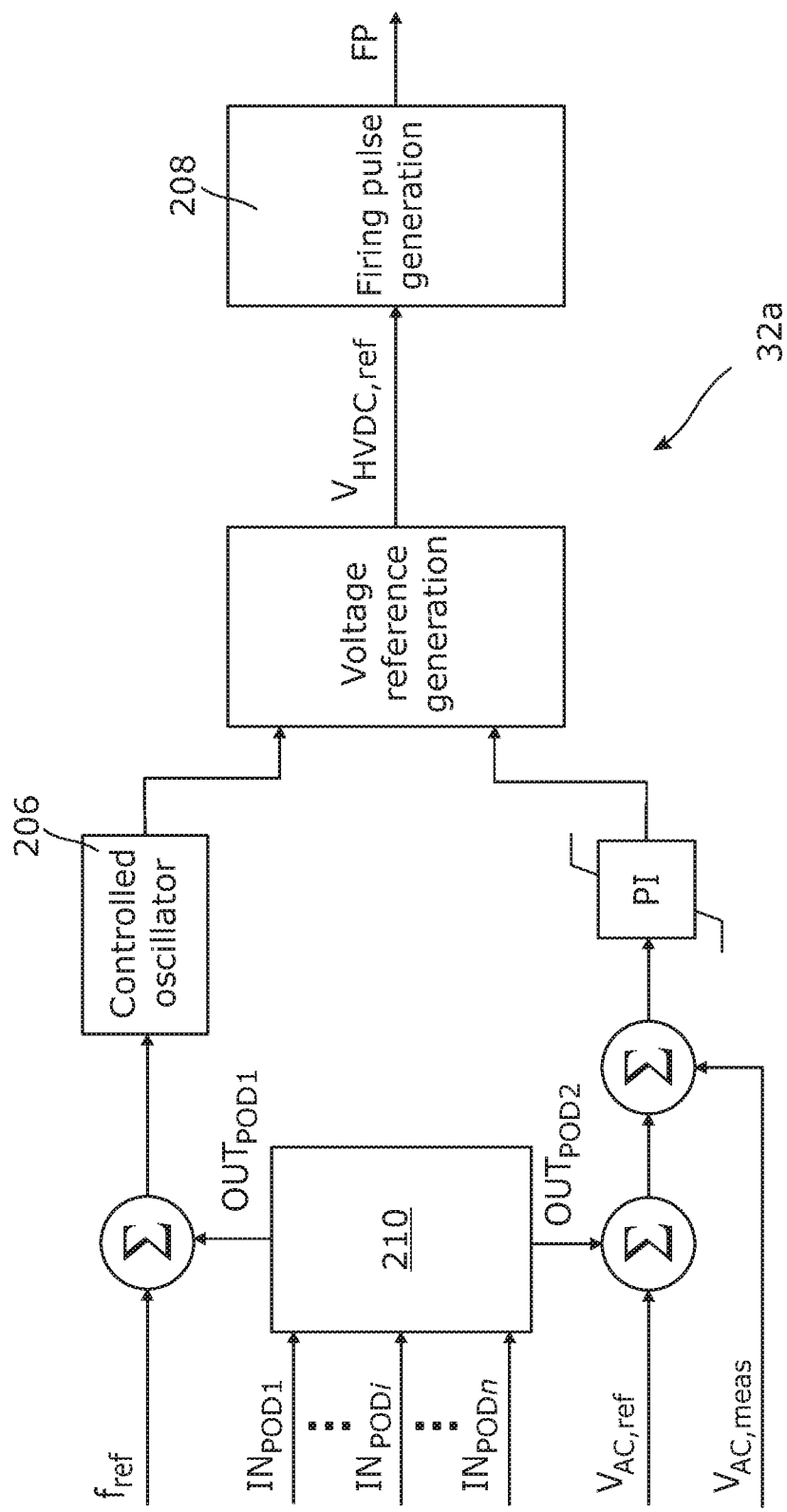
Figure 3:
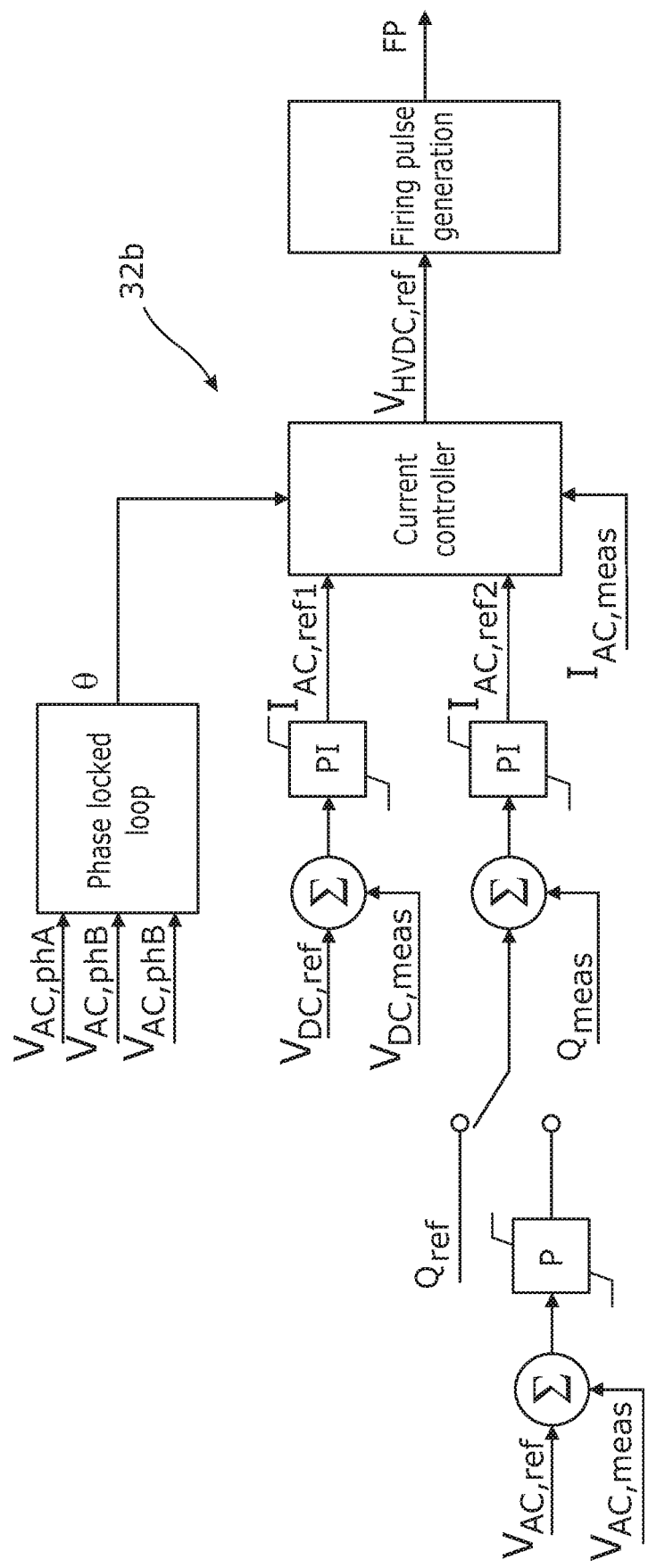
FIG. 3 shows, in schematic form, a second local controller of the power transmission network of FIG. 1.

The first power transmission network further includes a control system. The control system includes first and second local controllers 32a,32b for controlling the source and network side converters 24,22 respectively. Each local controller 32a,32b is located in the vicinity of the corresponding converter 24,22. FIGS. 2A and 2B respectively show, in schematic form, alternate configurations of the first local controller 32a for controlling the source side converter 24 while FIG. 3 shows, in schematic form, the configuration of the second local controller 32b for controlling the network side converter 22.

In use, the wind farm 28 generates a power into the AC transmission link 26. The AC transmission link 26 transmits the generated power to the AC connecting point of the source side converter 24. The source side converter 24 transfers the power from its AC connecting point to its DC connecting point, thus transferring power into the DC transmission link 20. The DC transmission link 20 transmits the generated power to the DC connecting point of the network side converter 22. The network side converter 22 transfers the power from its DC connecting point to its AC connecting point, thus transferring power into the AC power grid 30.

During operation of the first power transmission network, a variation in power generated by the wind farm 28 may arise due to its intermittent nature.

For economic reasons, instead of controlling the amount of power generated by the wind farm 28, the first power transmission network is configured to accommodate the variation in power generated by the wind farm 28, thereby transmitting all of the power generated by the wind farm 28 to the source side converter 24.

More particularly, the first local controller 32a is configured to operate the source side converter 24 in an AC voltage control mode as an AC slack bus to control a magnitude and frequency of an AC voltage of the AC transmission link 26 at a respective steady-state value and thereby facilitate variation of a power transfer between its AC and DC connecting points to accommodate the variation in power generated by the wind farm 28. Operation of the source side converter 24 in the AC voltage control mode facilitates generation of a stable AC voltage waveform in the AC transmission link 26 and thereby allows the wind farm 28 to synchronise to the stable AC voltage waveform. Such synchronisation ensures that any power generated by the wind farm 28 will be accommodated by the source side converter 24 and thereby injected into the DC transmission link 20 for subsequent transmission to the network side converter 22 and the AC power grid 30.

The steady-state values of the magnitude and frequency of the AC voltage of the AC transmission link 26 are controlled by the first local controller 32a through its operation of the source side converter 24 in the AC voltage control mode to generate an AC voltage at its AC connecting point in accordance with a converter AC voltage reference value $V_{HVDC,ref}$ that is derived from predefined magnitude and frequency reference values $V_{AC,ref}, f_{ref}$ for the AC voltage of the AC transmission link 26. The operation of the source side converter 24 in the AC voltage control mode as an AC slack bus to control a frequency of an AC voltage of the AC transmission link 26 at a steady-state value is carried out using an open loop control, as shown in FIGS. 2A and 2B, but may also be carried out using a feedback control using the measured frequency $f_{meas}$ of the AC transmission link 26 as a feedback signal.

In other embodiments of the invention, the converter AC voltage reference value $V_{HVDC,ref}$ may be derived from dynamic magnitude and frequency reference values $V_{AC,ref}$, $f_{ref}$, e.g. that are dispatched in real-time by a system operator.

Operation of the source side converter 24 in the AC voltage control mode however means that the DC voltage at the DC connecting point of the source side converter 24 is uncontrolled. This is because the two degrees of freedom available to the source side converter 24 is used to operate the source side converter 24 in the AC voltage control mode as an AC slack bus to control a magnitude and frequency of an AC voltage of the AC transmission link 26 at a respective steady-state value.

The second local controller 32b is configured to operate the network side converter 22 in a DC voltage control mode as a DC slack bus to control a DC voltage at its DC connecting point. Operating the network side converter 22 in the DC voltage control mode facilitates variation of a power transfer between its AC and DC connecting points to accommodate the variation in power generated by the wind farm 28, thus enabling power transmission in the first power transmission network.

It is envisaged that, in other embodiments of the invention, the second local controller may be configured to operate the network side converter to fix the DC voltage at its DC connecting point.

It will be understood that control of the DC voltage at the DC connecting point may be a direct result of the control of the DC voltage at the DC connecting point or be an indirect result of the control of another DC voltage at another point in the power transmission network.

The frequency characteristic(s) of the wind farm 28 may differ from that of the source side converter 24. A difference in frequency characteristic(s) between the wind farm 28 and the source side converter 24 may arise as a result of, for example, the application of different control strategies in operating the wind farm 28 and the source side converter 24. In addition, since the wind farm 28 and the source side converter 24 may be manufactured and supplied independently of each other, the controller (not shown) for the wind farm 28 may be designed independently of the first local controller 32a, thus potentially resulting in a difference in frequency characteristic(s) between the wind farm 28 and the source side converter 24.

During operation of the first power transmission network, the relative electrical proximity between the wind farm 28 and the source side converter 24 allows a frequency component generated by the wind farm 28 to influence the source side converter 24, and a frequency component generated by the source side converter 24 to influence the wind farm 28. This means that generation of an undesirable frequency by the wind farm 24 could lead to destabilisation of the operation of the source side converter 24, and generation of an undesirable frequency by the source side converter 24 could lead to destabilisation of the operation of the wind farm 28, thus adversely affecting the stability of the first power transmission network.

In addition, during the operation of the power transmission network, the interaction between the source side converter 24 and the AC transmission link 26 allows a frequency component generated by the source side converter 24 to influence the AC transmission link 26, and the AC transmission link 26 has a frequency-dependent impedance characteristic that may include peaks and trough representing resonances that can be excited by an active element, such as the source side converter 24 or the wind farm 28. This means that generation of an undesirable frequency by the source side converter 24 could lead to destabilisation of the operation of the AC transmission link 26, and excitation of the resonances that characterise the AC transmission link impedance could result in generation of an undesirable frequency, thus adversely affecting the stability of the power transmission network.

The frequency component may be a frequency component of a power oscillation between the source side converter 24 and the wind farm 28, a power oscillation between the AC transmission link 26 and the source side converter 24, or a power oscillation between two or more of a plurality of electrical elements (e.g. wind turbine clusters) of the wind farm 28.

The first local controller 32a is further configured, either as shown in FIG. 2A or FIG. 2B, to operate the source side converter 24 in a frequency damping mode during its operation in the AC voltage control mode.

When the first local controller 32a is configured as shown in FIG. 2A, the first local controller 32a is configured to passively modify the magnitude reference value $V_{AC,ref}$ for the AC voltage for the AC transmission link 26 and the converter AC voltage reference value $V_{HVDC,ref}$ for an AC voltage of the source side converter 24, and to operate the source side converter 24 in the frequency damping mode in accordance with each modified reference value.

More specifically, in FIG. 2A, the first local controller 32a includes first and second sets of band-stop filters 200, 202. The first set of band-stop filters 200 is tuned to at least one predefined frequency and is arranged to filter the error signal between the magnitude reference value $V_{AC,ref}$ and the measured AC voltage $V_{AC,meas}$ of the AC transmission link 26. The filtered error signal is then processed using a proportional-integral control block and then combined with the frequency reference value $f_{ref}$ (which is processed using a controlled oscillator) in a voltage reference generation block 206 to generate a converter AC voltage reference value $V_{HVDC,ref}$. The second set of band-stop filters 202 is tuned to at least one predefined frequency and is arranged to filter the converter AC voltage reference value $V_{HVDC,ref}$. In this manner the first local controller 32a filters the magnitude reference value $V_{AC,ref}$ and the converter AC voltage reference value $V_{HVDC,ref}$ and generates filtered magnitude and converter AC voltage reference values.

It is envisaged that, if the operation of the source side converter 24 in the AC voltage control mode as an AC slack bus to control a frequency of an AC voltage of the AC transmission link 26 at a steady-state value is carried out using the earlier-mentioned feedback control, a set of band-stop filters may be used to filter an error signal between the frequency reference value $f_{ref}$ and the measured frequency $f_{meas}$ of the AC transmission link 26 so that the error signal, instead of the frequency reference value $f_{ref}$, can be used to generate the converter AC voltage reference value $V_{HVDC,ref}$.

The filtered converter AC voltage reference value is then sent to a firing pulse generation block 208 to generate the required firing pulses to operate the source side converter 24 in the frequency damping mode in accordance with each filtered reference value.

As the steady-state values of the magnitude and frequency of the AC voltage of the AC transmission link 26 are controlled by the first local controller 32a through its operation of the source side converter 24 in the AC voltage control mode to generate an AC voltage at its AC connecting point in accordance with the converter AC voltage reference value $V_{HVDC,ref}$, the generation of the filtered magnitude and converter AC voltage reference values enables the first local controller 32a to operate the source side converter 24 to attenuate one or more predefined frequencies in the AC voltage at the AC connecting point of the source side converter 24 by inhibiting generation of at least one frequency component by the source side converter 24 that could adversely impact the operation of the wind farm 28.

When the first local controller 32a is configured as shown in FIG. 2b, the first local controller 32a is configured to actively modify the magnitude and frequency reference values $V_{AC,ref}, f_{ref}$ for the AC voltage for the AC transmission link 26, and to operate the source side converter 24 in the frequency damping mode in accordance with each modified reference value.

Figure 2C:
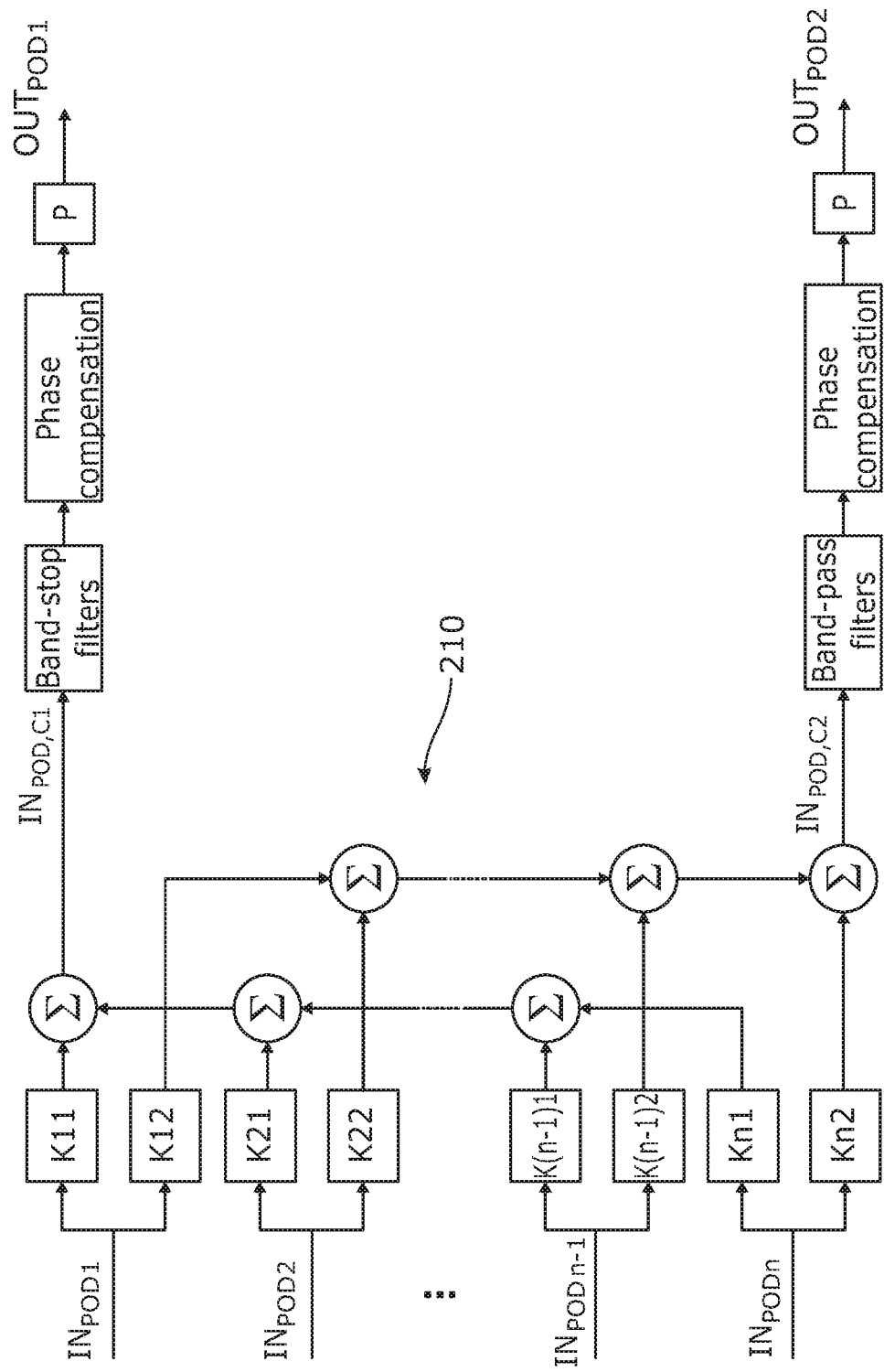

More specifically, as shown in FIG. 2b, the first local controller 32a includes a frequency damping control block 210 that is configured to receive measurements $IN_{POD1}$, $IN_{POD2}$, ..., $IN_{PODn}$. The frequency damping control block 210 is further configured to process each of the received measurements $IN_{POD1}, IN_{POD2}, ..., IN_{PODn}$ to generate modulating signals $OUT_{POD1}, OUT_{POD2}$. More specifically, in an exemplary implementation of the frequency damping control block 210 as shown in FIG. 2C, the frequency damping control block 210 is divided into two parallel branches, where the output $OUT_{POD1}$ of the first parallel branch is fed back to the main part of the first local controller 32a to modulate the frequency reference value $f_{ref}$, and the output $OUT_{POD2}$ of the second parallel branch is fed back to the main part of the first local controller 32a to modulate the magnitude reference value $V_{AC,ref}$. For each of the parallel branches, each of the individual input signals, i.e. the received measurements $IN_{POD1}, IN_{POD2}, ..., IN_{PODn}$, is scaled before it is added to other input signals to formulate a single input signal ($IN_{POD,C1}, IN_{POD,C2}$) to a given parallel branch. The input signals to the parallel branches are then processed through band-pass filters to extract the frequency components to be damped by the source side converter 24. Finally the phases and magnitudes of the modulating signals $OUT_{POD1}, OUT_{POD2}$ are shaped by phase compensation blocks and by proportional gains.

The first local controller 32a then modulates the magnitude and frequency reference values $V_{AC,ref}, f_{ref}$ through their respective combination with the modulating signals $OUT_{POD1}, OUT_{POD2}$ in order to generate modulated magnitude and frequency reference values that permit operation of the source side converter 24 to inject at least one additional frequency component into its AC connecting point and/or the AC transmission link 26.

It will be appreciated that the frequency damping control block 210 may be configured to receive and process other electrical measurements.

The frequency damping control block 210 may be configured to receive and process an electrical measurement that corresponds to any electrical quantity belonging to the AC transmission link 26 between the wind farm 28 and the source side converter 24. Such an electrical quantity may be, but is not limited to, the AC frequency of the AC transmission link 26, the magnitude of alternating current flowing in the AC transmission link 26, active power transmitted in the AC transmission link 26 or reactive power being transmitted in the AC transmission link 26.

Alternatively the frequency damping control block 210 may be configured to receive and process an electrical measurement corresponding to an internal electrical quantity of the wind farm 28, e.g. active power on one of the wind turbine strings of the wind farm 28.

The modulated magnitude reference value $V_{AC,ref}$, which may be first altered through combination with a measured AC voltage $V_{AC,meas}$ of the AC transmission link 26, is then processed using a proportional-integral control block and then combined with the modulated frequency reference value $f_{ref}$ (which is processed using a controlled oscillator) in a voltage reference generation block 206 to generate a converter AC voltage reference value $V_{HVDC,ref}$.

The converter AC voltage reference value $V_{HVDC,ref}$ is then sent to a firing pulse generation block 208 to generate the required firing pulses to operate the source side converter 24 in the frequency damping mode in accordance with each modulated reference value.

As the steady-state values of the magnitude and frequency of the AC voltage of the AC transmission link 26 are controlled by the first local controller 32a through its operation of the source side converter 24 in the AC voltage control mode to generate an AC voltage at its AC connecting point in accordance with the converter AC voltage reference value $V_{HVDC,ref}$, the generation of the modulated magnitude and frequency reference values enables the first local controller 32a to operate the source side converter 24 to inject at least one additional frequency component into its AC connecting point and/or the AC transmission link 26 during its operation in the AC voltage mode. By way of injection of the or each additional frequency component into its AC connecting point and/or the AC transmission link 26, the source side converter 24 is operated to provide an active damping power at one or more predefined frequencies to damp at least one frequency component at its AC connecting point and/or in the AC transmission link 26. In this manner the source converter 24 can be operated to provide the active damping power to provide stable power transmission in the first power transmission network.

Hence, the inclusion of the control system in the first power transmission network permits control of the source side converter 24 to damp at least one frequency component at the AC connecting point of the source side converter 24 and/or in the AC transmission link 26 and thereby permits damping of at least one undesirable frequency that could destabilise the operation of the wind farm 28 and/or the source side converter 24. Moreover configuration of the control system as set out above enables damping of at least one frequency component to provide stable power transmission in the first power transmission network during the operation of the source side converter 24 in the AC voltage control mode to accommodate a variation in power generated by the wind farm 28.

The ability of the control system to operate the source side converter 24 in a frequency damping mode to damp at least one frequency component at the AC connecting point of the source side converter 24 and/or in the AC transmission link 26 therefore results in a more reliable first power transmission network.

It is envisaged that, in other embodiments of the invention, the frequency damping control block may be configured to generate only one of the modulating signals OUT$_{POD1}$, OUT$_{POD2}$. In such embodiments, the frequency damping control block may include a single branch to provide a single output to the main part of the first local controller.

It is envisaged that, in still other embodiments of the invention, the frequency damping control block may include a plurality of branches, each providing a respective output to the main part of the first local controller.

Figure 4:
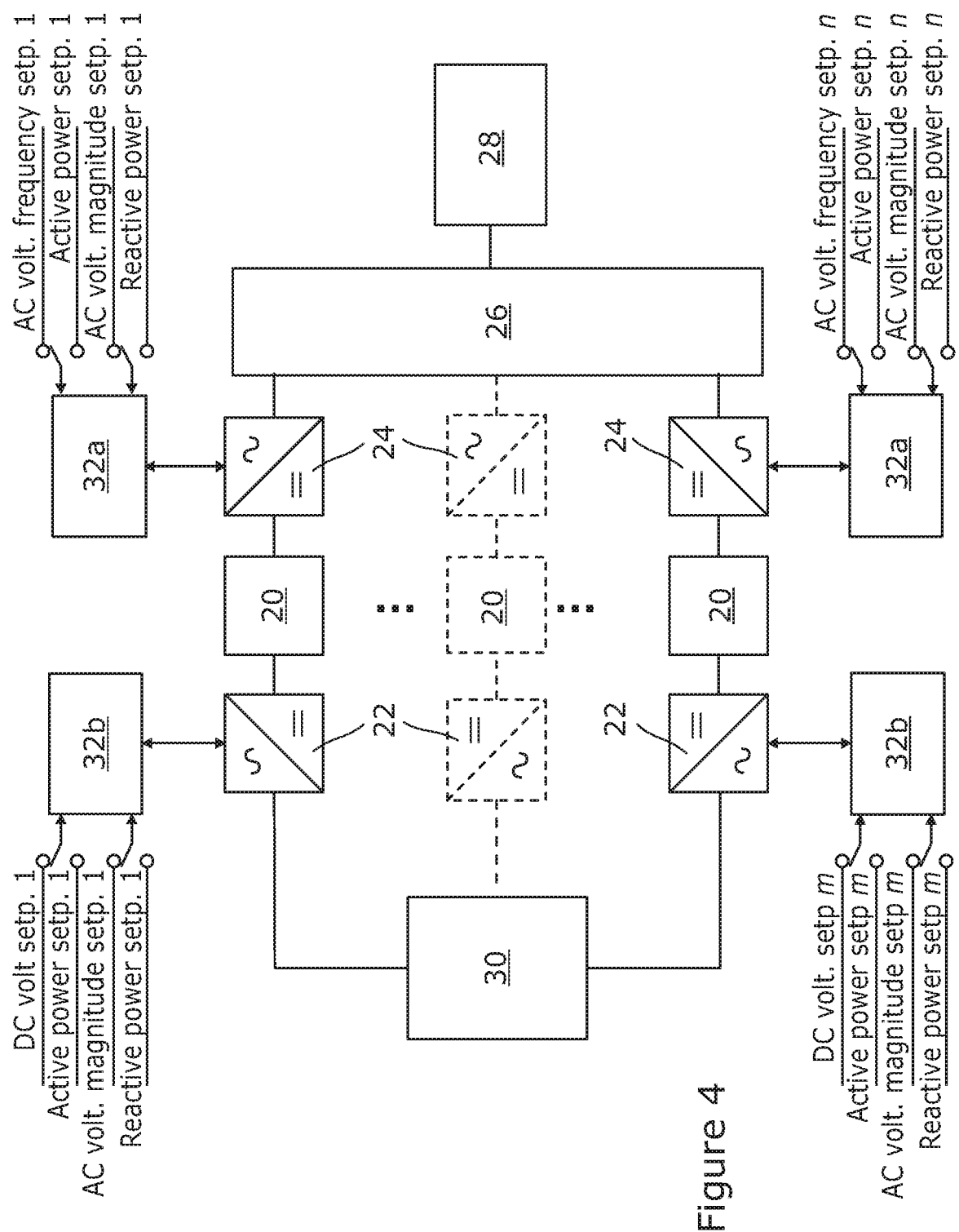
FIG. 4 shows, in schematic form, a power transmission network.

A second power transmission network according to a second embodiment of the invention is shown in FIG. 4.

The second power transmission network comprises: a plurality of DC transmission links 20, each DC transmission link 20 being for DC power transmission between a network side converter 22 and a source side converter 24; an AC transmission link 26 for AC power transmission from a wind farm 28 to a plurality of source side converters 24; a wind farm 28; a plurality of source side converters 24, each source side converter 24 including: a DC connecting point connected to a first end of a respective one of the DC transmission links 20; and an AC connecting point connected to the AC transmission link 26; a plurality of network side converters 22, each network side converter 22 including: an AC connecting point for connection to the AC power grid 30; and a DC connecting point connected to a second end of a respective one of the DC transmission links 20.

In this manner the second power transmission network is configured as a multiple point-to-point power transmission network for interconnecting the wind farm 28 and AC power grid 30. It is envisaged that, in other embodiments of the invention, an AC connecting point of each network side converter is for connection to a respective one of a plurality of AC power grids.

The second power transmission network further includes a control system. The control system includes a plurality of first and second local controllers 32a,32b for controlling the source and network side converters 24,22 respectively. Each local controller 32a,32b is located in the vicinity of the corresponding converter 24,22. The configuration of each first local controller 32a for each network side converter 22 is identical to either of the configurations of the first local controller 32a shown in FIGS. 2A and 2B. The configuration of each second local controller 32b for each network side converter 22 is identical to the configuration of the second local controller 32b shown in FIG. 3.

In use, the wind farm 28 generates a power into the AC transmission link 26. The AC transmission link 26 transmits the generated power to the AC connecting point of each source side converter 24. Each source side converter 24 transfers the power from its AC connecting point to its DC connecting point, thus transferring power into the respective DC transmission link 20. Each DC transmission link 20 transmits power from the DC connecting point of the respective source side converter 24 to the DC connecting point of the respective network side converter 22. Each network side converter 22 transfers the power from its DC connecting point to its AC connecting point, thus transferring power into the AC power grid 30.

During operation of the second power transmission network, a variation in power generated by the wind farm 28 may arise due to its intermittent nature.

The above-described operation of each source side converter 24 of the second power transmission network applies mutatis mutandis to the operation of each source side converter 24 of the second power transmission network.

The above-described operation of each network side converter 22 of the second power transmission network applies mutatis mutandis to the operation of each network side converter 22 of the second power transmission network.

It is envisaged that, in other embodiments of the invention, the control system may be configured to operate at least one source side converter 24 in an AC voltage control mode as an AC slack bus to control a magnitude of an AC voltage of the AC transmission link 26 at a steady-state value and to operate at least one other source side converter 24 in an AC voltage control mode as an AC slack bus to control a frequency of an AC voltage of the AC transmission link 26 at a steady-state value, and thereby facilitate variation of a power transfer between the AC and DC connecting points of each source side converter 24 to accommodate a variation in power generated by the wind farm 28.

It will be appreciated that power transmission in the second power transmission network may be carried out by operating at least one, but not all, of the plurality of source side converters 24 in the AC voltage control mode and/or the frequency damping mode.

As discussed above, it is normally required to control at least one source side converter 24 in the AC voltage control mode as an AC slack bus to establish a stable voltage reference for the AC transmission link 26 in order to facilitate variation of a power transfer between the AC and DC connecting points of each source side converter 24 to accommodate a variation in power generated by the wind farm 28.

It is, however, not essential for each of the plurality of source side converters 24 to be operated in the AC voltage control mode as an AC slack bus. When at least one first source side converter 24 is operated in the AC voltage control mode, at least one second source side converter 24 may be operated as an active and/or reactive power sink or source.

Figure 5A:
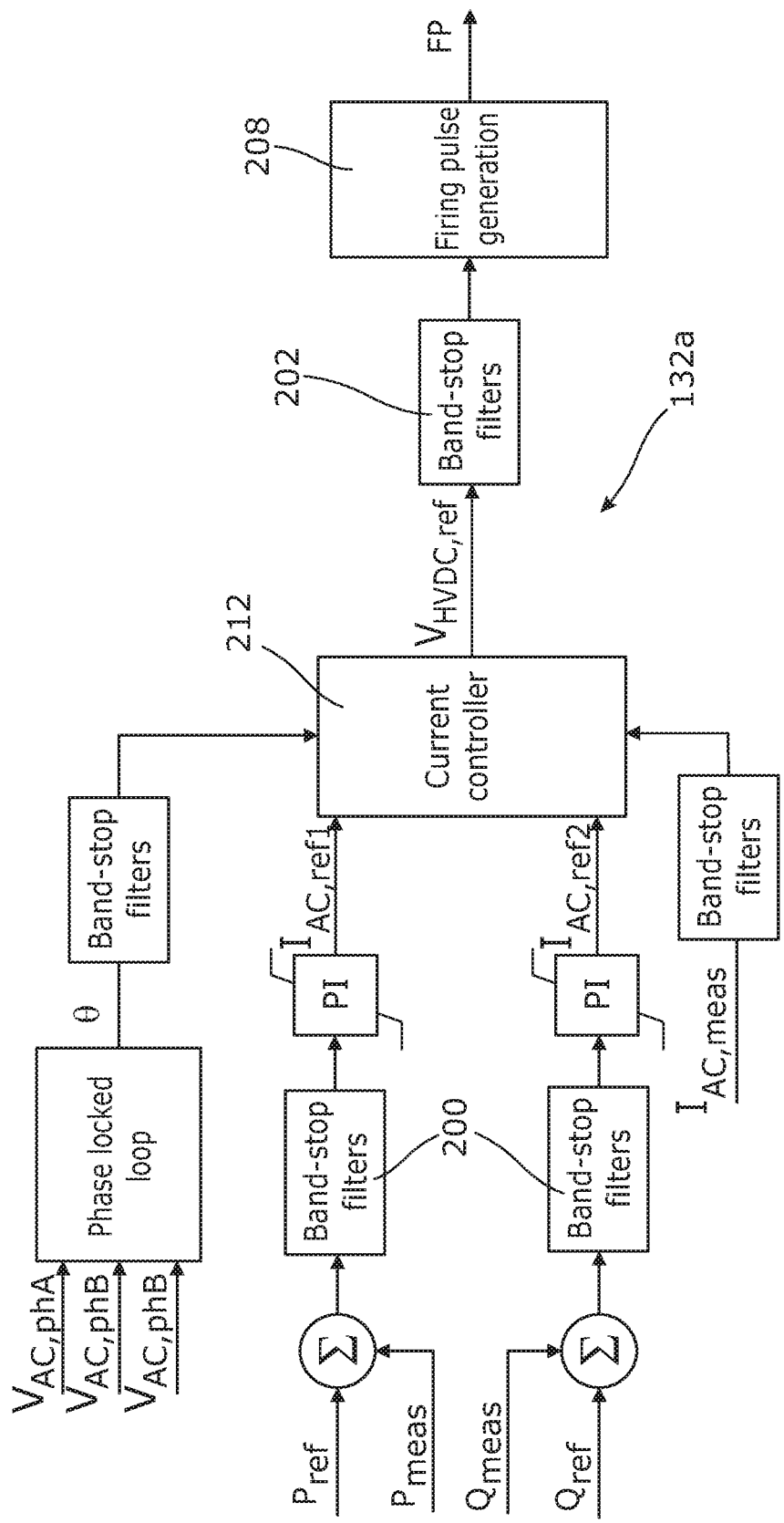
FIGS. 5A and 5B respectively show, in schematic form, further variations of a first local controller of the power transmission network of FIG. 1.
Figure 5B:
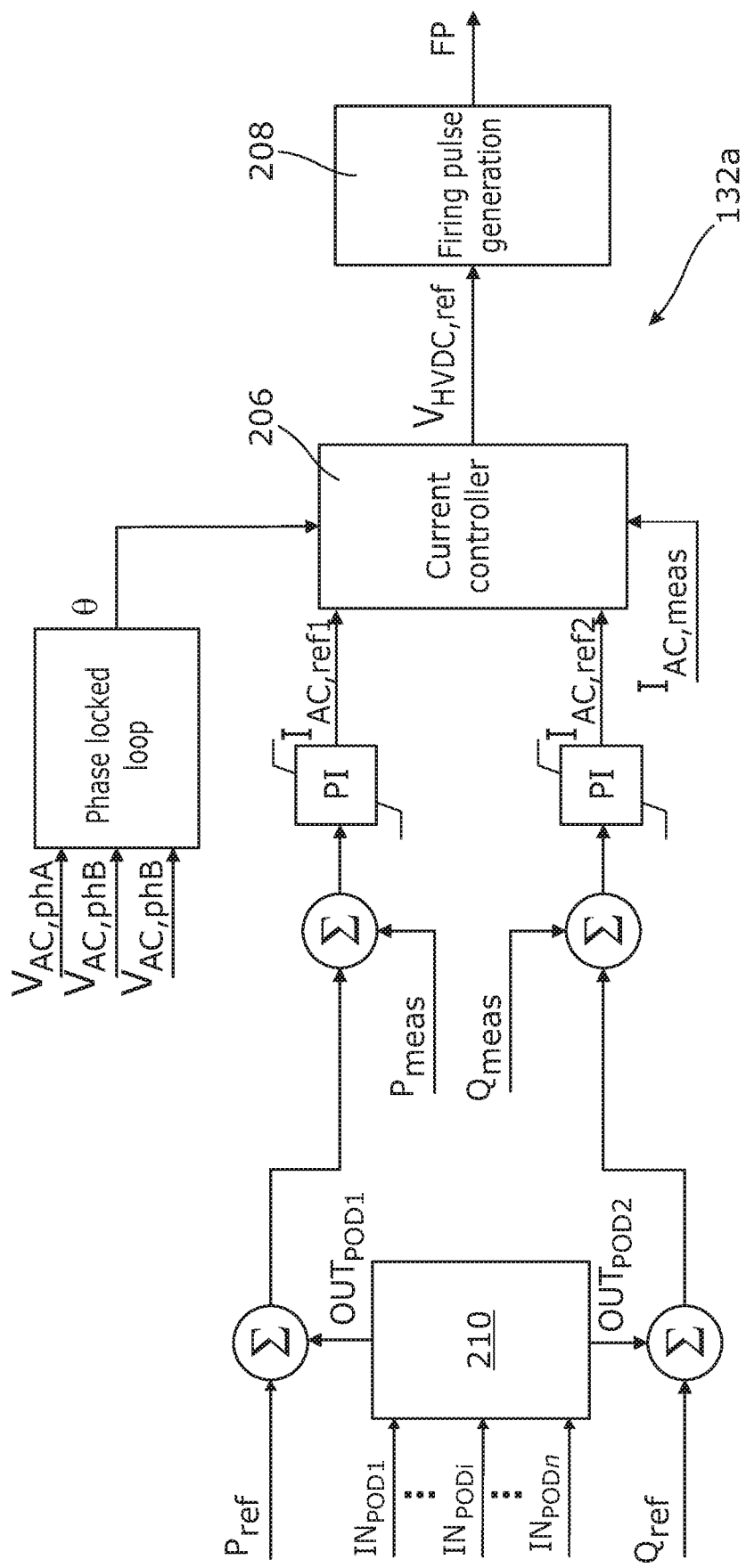

For the or each second source side converter 24 operated as an active and/or reactive power sink or source, the corresponding first local controller 132a is similar to the first local controller 32a in FIGS. 2A and 2B, but differs in that the corresponding first local controller 132a is configured, either as shown in FIG. 5A or FIG. 5B, to operate the or each second source side converter 24 in a frequency damping mode during its operation as an active and/or reactive power sink or source.

When the first local controller 132a is configured as shown in FIG. 5A, the first local controller 132a is configured to passively modify the active power reference value P$_{ref}$ for the active power of the AC transmission link 26 and the reactive power reference $Q_{ref}$ for the reactive power of the AC transmission link 26, and to operate the or each second source side converter 24 in the frequency damping mode in accordance with each modified reference value.

More specifically, in FIG. 5A, the first local controller 132a includes first and second sets of band-stop filters 200,202. The first set of band-stop filters 200 is tuned to at least one predefined frequency and is arranged to filter: a first error signal between the active power reference value $P_{ref}$ and the measured active power $P_{meas}$ of the AC transmission link 26; and a second error signal between the reactive power reference value $Q_{ref}$ and the measured reactive power $Q_{meas}$ of the AC transmission link 26. Each filtered error signal is then processed using a respective proportional-integral control block and then combined with a filtered phase value and a filtered measured current of the AC transmission link 26 in a current controller block 212 to generate a converter AC voltage reference value $V_{HVDC,ref}$. The second set of band-stop filters 202 is tuned to at least one predefined frequency and is arranged to filter the converter AC voltage reference value $V_{HVDC,ref}$. In this manner the first local controller 132a filters the active and reactive power reference values $P_{ref},Q_{ref}$ and generates filtered power and converter AC voltage reference values.

The filtered phase value is generated by using a phased locked loop coupled to the phase voltages $V_{AC,phA},V_{AC,phB},V_{AC,phC}$ of the AC transmission link 26 and by filtering the output of the phased locked loop using an additional set of band-stop filters. The filtered measured current of the AC transmission link 26 is obtained by filtering the measured current $I_{AC}$ of the AC transmission link 26 using a further additional set of band-stop filters.

The filtered converter AC voltage reference value is then sent to a firing pulse generation block 208 to generate the required firing pulses to operate the or each second source side converter 24 in the frequency damping mode in accordance with each filtered reference value.

When the first local controller 132a is configured as shown in FIG. 5B, the first local controller 132a is configured to actively modify the active and reactive power reference values $P_{ref},Q_{ref}$ for the active and reactive power of the AC transmission link 26, and to operate the or each second source side converter 24 in the frequency damping mode in accordance with each modified reference value.

More specifically, as shown in FIG. 5B, the first local controller 132a includes a frequency damping control block 210 that is similar in structure and operation to the frequency damping control block 210 of FIG. 2C. In this case, the output $OUT_{POD1}$ of the first parallel branch is fed back to the main part of the first local controller 132a to modulate the active power reference value $P_{ref}$, and the output $OUT_{POD2}$ of the second parallel branch is fed back to the main part of the first local controller 132a to modulate the reactive power reference value $Q_{ref}$.

The first local controller 132a then modulates the active and reactive power reference values $P_{ref},Q_{ref}$ through their respective combination with the modulating signals $OUT_{POD1}$, $OUT_{POD2}$ order to generate modulated active and reactive power reference values that permit operation of the or each second source side converter 24 to inject at least one additional frequency component into its AC connecting point and/or the AC transmission link 26.

The modulated active and reactive power reference values, which may be first altered through combination with respective measured active and reactive power $P_{meas},Q_{meas}$ of the AC transmission link 26, is then processed using respective proportional-integral control blocks and then combined with a phase value and a measured current $I_{AC}$ of the AC transmission link 26 in a current controller block 212 to generate a converter AC voltage reference value $V_{HVDC,ref}$. The phase value is generated by using a phased locked loop coupled to the phase voltages $V_{AC,phA},V_{AC,phB},V_{AC,phC}$ of the AC transmission link 26.

The converter AC voltage reference value $V_{HVDC,ref}$ is then sent to a firing pulse generation block 208 to generate the required firing pulses to operate the or each second source side converter 24 in the frequency damping mode in accordance with each modulated reference value.

Optionally at least one first source side converter may be operated in the AC voltage control mode without being controlled in the frequency damping mode, while at least one second source side converter may be operated in the frequency damping mode during its operation as an active and/or reactive power sink or source. Further optionally at least one first source side converter may be operated in the frequency damping mode during its operation in the AC voltage control mode, while at least one second source side converter may be operated as an active and/or reactive power sink or source without being controlled in the frequency damping mode.

It will be also appreciated that power transmission in the second power transmission network may be controlled by operating at least one, but not all, of the plurality of network side converters 22 in the DC voltage control mode.

In normal design practice for a controller using a cascaded control loop, each consecutive control stage is designed to be adequately faster than the previous control stage to ensure that the overall control system is stable. As a consequence, an outer control loop will be significantly slower (i.e. have lower bandwidth) than an inner control loop. Hence, if the bandwidth of the outer control loops, such as those relating to the magnitude and frequency of the AC voltage of the AC transmission link 26 and the active and reactive power of the AC transmission links, is not sufficient to provide the required active damping at the oscillation frequency of interest, the outputs $OUT_{POD1},OUT_{POD2}$ of the frequency damping control block 210 can be instead fed back to inner control loops in order to ensure that the required active damping can be provided.

Figure 6:
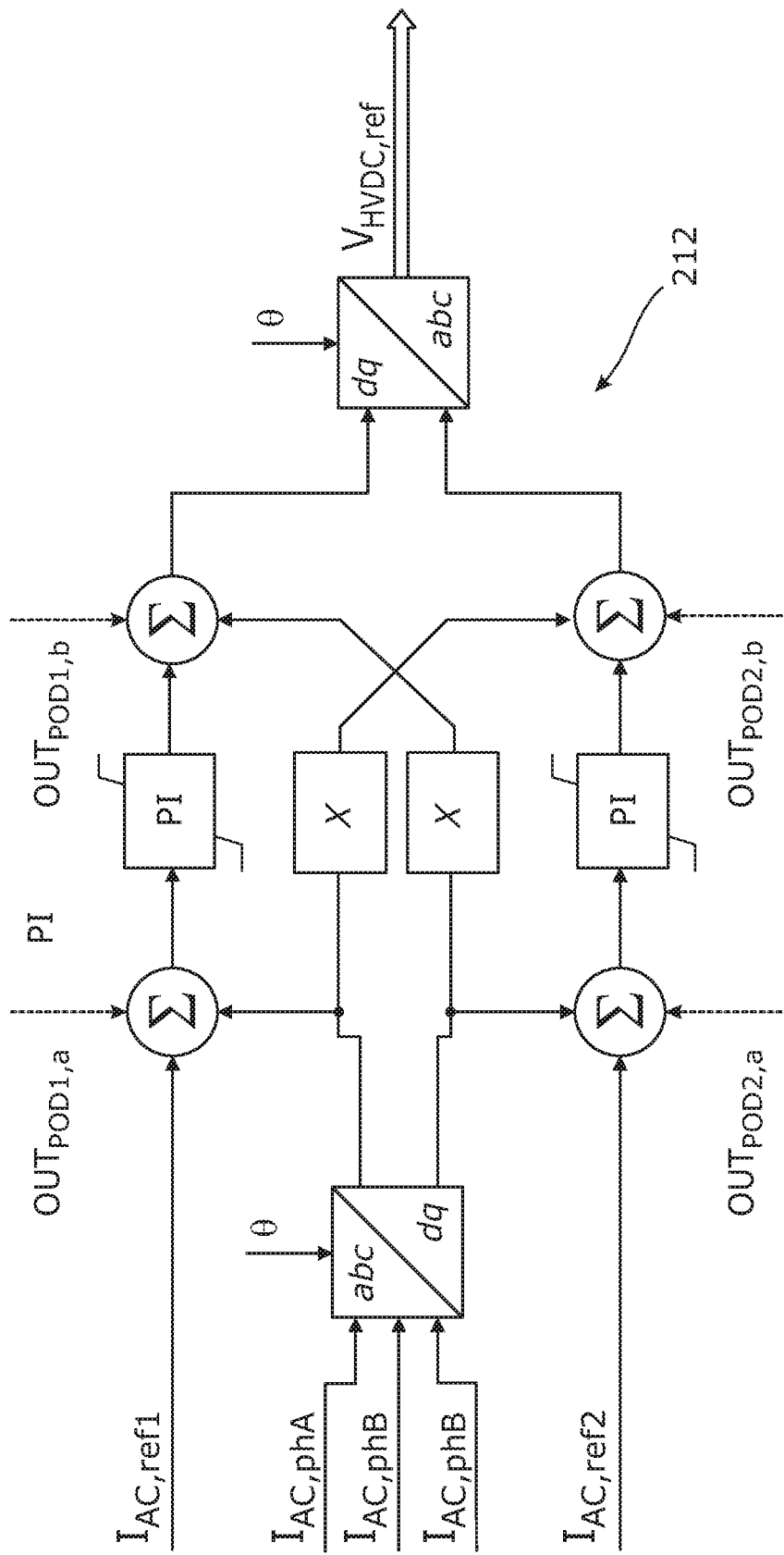
FIG. 6 shows, in schematic form, an inner current controller block.

FIG. 6 shows, in schematic form, an exemplary inner current controller block 212 for the first local controller 132a. As shown in FIGS. 5A and 5B, the current controller block 212 receives: the filtered first error signal between the active power reference value $P_{ref}$ and the measured active power $P_{meas}$ of the AC transmission link 26, after the filtered first error signal is processed using a proportional-integral control block;

the filtered second error signal between the reactive power reference value $Q_{ref}$ and the measured reactive power $Q_{meas}$ of the AC transmission link 26, after the filtered second error signal is processed using a proportional-integral control block.

The filtered first and second error signals then respectively undergo a first combination with direct and quadrature rotating reference frame components of the AC phase currents $I_{AC,phA},I_{AC,phB},I_{AC,phC}$ of the AC transmission link 26, which are derived from a three-phase stationary reference frame to direct/quadrature rotating reference frame transformation (abc-to-dq) of the AC phase currents $I_{AC,phA},I_{AC,phB},I_{AC,phC}$ of the AC transmission link 26, whereby the abc-to-dq transformation uses the phase value (or filtered phase value) received from the phased locked loop.

The outputs of the first combination are then processed using respective proportional-integral control blocks before respectively undergoing a second combination with decoupling terms in the form of reactance values X. More specifically, the quadrature-axis current is scaled by the value of the associated reactance X to produce a resulting signal which is then applied to the second combination for the direct-axis current controller, and the direct-axis current is scaled by the value of the associated reactance X to produce a resulting signal which is then applied to the second combination for the quadrature-axis current controller.

The optional decoupling terms are added to improve the decoupling of the direct-axis current controller and the quadrature-axis current controller from each other, in order to improve the dynamic performance of the inner current controller block 212. This is because any voltage change that the direct-axis current controller exerts on the converter AC voltage (more specifically the direct-axis component of the converter AC voltage) will not only affect the direct-axis current but also to some extent the quadrature-axis current, and any voltage change that the quadrature-axis current controller exerts on the converter AC voltage (more specifically the quadrature-axis component of the converter AC voltage) will not only affect the quadrature-axis current but also to some extent the direct-axis current. The strength of the coupling between the direct-axis and quadrature-axis current controllers depends on the amount of reactance X between the point of control and the source side converter's AC connecting point, which are normally different from one another.

The outputs of the second combination undergo a direct/quadrature rotating reference frame to a three-phase stationary reference frame transformation (dq-to-abc) to generate the converter AC voltage reference value $V_{HVDC,ref}$, whereby the dq-to-abc transformation uses the phase value (or filtered phase value) received from the phased locked loop.

The outputs $OUT_{POD1}$, $OUT_{POD2}$ of the frequency damping control block 210 can be fed back into the current controller block 212 either during the first or second combination. FIG. 6 indicates the feedback of the outputs $OUT_{POD1,a}$, $OUT_{POD2,a}$ into the current controller block 212 during the first combination, and the feedback of the outputs $OUT_{POD1,b}$, $OUT_{POD2,b}$ into the current controller block 212 during the second combination.

It will be appreciated that embodiments of the invention are applicable to other power transmission networks with a configuration that includes: a variable power source; an AC transmission link for AC power transmission from the variable power source to at least one source side converter; and at least one source side converter including: an AC connecting point operably connected to the AC transmission link; and a DC connecting point for connection to a DC transmission link.

It is envisaged that, in other embodiments of the invention, the or each wind farm may be replaced by another type of variable power source, such as a tidal or solar farm, and/or the AC power grid may be replaced by another type of AC electrical network.

The configuration of the control system may vary depending on specific requirements of each of the first and second power transmission networks. In one example, in place of the local controllers, the control system may include a global controller for controlling the source and network side converters, and the global controller may be configured to communicate with each converter via telecommunications links. In another example, in addition to the local controllers, the control system may include the global controller for controlling the source and network side converters, and the global controller may be configured to communicate with at least one local controller via telecommunications links.

It will be appreciated that the configuration of the local controllers were merely chosen to help illustrate the operation of embodiments of the invention, and that each of the local controllers may be replaced by another type of controller with a different configuration. It will also be appreciated that the input values received by the local controllers of the control system shown in FIGS. 2a, 2b and 3 were merely chosen to help illustrate the operation of embodiments of the invention, that not all of the input values are required for the control system to carry out its function, and that other types of input values may be provided to the control system in order for it to carry out its function.

Each of the following additions and/or modifications may be made to the control system.

The control system may be configured to receive and use only one feedback signal or a plurality of feedback signals.

A set of band-stop filters could be used to filter any input signal of the control system (e.g. measured signals, such as voltage magnitude or frequency). The configuration of the band-stop filters in this manner prevents harmful frequency components, which could be generated by the wind farm, from affecting the control system.

Different sets of band-stop filters associated with different input signals may be tuned to identical or different frequencies.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power transmission network comprising:
   a variable power source;
   an AC transmission link for AC power transmission from the variable power source to at least one source side converter;
   the at least one source side converter including: an AC connecting point operably connected to the AC transmission link; and a DC connecting point for connection to a DC transmission link; and
   a control system configured to operate the source side converter or at least one of the source side converters in a frequency damping mode to control an AC voltage at its AC connecting point and thereby damp at least one frequency component at its AC connecting point and/or in the AC transmission link,
   wherein the control system is configured to actively modify a magnitude reference value for an AC voltage of the AC transmission link or a frequency reference value for an AC voltage of the AC transmission link, and to operate the at least one source side converter in the frequency damping mode in accordance with the modified reference value.

2. The power transmission network according to claim 1 wherein the control system is configured to operate the source side converter or at least one of the source side converters in an AC voltage control mode as an AC slack bus to control a magnitude and/or a frequency of an AC voltage of the AC transmission link at a respective steady-state value and thereby facilitate variation of a power transfer between its AC and DC connecting points so as to accommodate a variation in power generated by the variable power source, and the control system is further configured to operate the source side converter or at least one of the source side converters in the frequency damping mode during its operation in the AC voltage control mode.

3. The power transmission network according to claim 1 wherein damping at least one frequency component includes minimising, cancelling and/or inhibiting generation of at least one frequency component.

4. The power transmission network according to claim 1 wherein the frequency component is generated by:
the source side converter or at least one of the source side converters;
excitation of a resonance of a frequency-dependent impedance characteristic of the AC transmission link; or
the variable power source.

5. The power transmission network according to claim 1 wherein the frequency component is a frequency component of:
a power oscillation between the source side converter or at least one of the source side converters and the variable power source;
a power oscillation between the AC transmission link and the source side converter or at least one of the source side converters; or
a power oscillation between two or more of a plurality of electrical elements of the variable power source.

6. The power transmission network according to claim 1 wherein the control system is configured to filter at least one signal corresponding to a characteristic of the power transmission network so as to attenuate one or more frequency components in the signal to provide a respective filtered reference value, and to operate the source side converter or at least one of the source side converters in the frequency damping mode in accordance with the filtered reference value.

7. The power transmission network according to claim 6 wherein the control system is configured to modulate the magnitude reference value or the frequency reference value, and to operate the source side converter or at least one of the source side converters in the frequency damping mode in accordance with the modulated reference value.

8. The power transmission network according to claim 7 wherein the control system is configured to modulate the magnitude reference value or the frequency reference value, and to operate the source side converter or at least one of the source side converters in the frequency damping mode in accordance with the modulated reference value and thereby inject at least one additional frequency component into its AC connecting point and/or the AC transmission link.

9. The power transmission network according to claim 1 including:
the AC transmission link for AC power transmission from the variable power source to a plurality of source side converters;
the plurality of source side converters, each source side converter including: a DC connecting point for connection to a respective one of a plurality of DC transmission links; and an AC connecting point operably connected to the AC transmission link.

10. The power transmission network according to claim 9 wherein the control system is configured to operate at least one source side converter in an AC voltage control mode as an AC slack bus to control a magnitude of an AC voltage of the AC transmission link at a steady-state value and to operate at least one other source side converter in an AC voltage control mode as an AC slack bus to control a frequency of an AC voltage of the AC transmission link at a steady-state value, and thereby facilitate variation of a power transfer between the AC and DC connecting points of each source side converter to accommodate a variation in power generated by the variable power source.

11. The power transmission network according to claim 9 wherein the control system is configured to operate at least one source side converter in an AC voltage control mode as an AC slack bus to control a magnitude and frequency of an AC voltage of the AC transmission link at a respective steady-state value and thereby facilitate variation of a power transfer between its AC and DC connecting points to accommodate a variation in power generated by the variable power source.

12. The power transmission network according to claim 1 wherein the control system is configured to operate the source side converter or the at least one source side converter in the frequency damping mode and as an active and/or reactivate power sink or source.

13. The power transmission network according to claim 1 wherein the control system is configured to passively and/or actively modify an active power reference value for an active power of the AC transmission link and/or an a reactive power reference value for a reactive power of the AC transmission link, and to operate the source side converter or at least one of the source side converters in the frequency damping mode in accordance with the or each modified referenced value.

14. The power transmission network according to claim 13 wherein the control system is configured to filter at least one signal corresponding to an active or reactive power characteristic of the power transmission network so as to attenuate one or more frequency components in the or each signal to provide a respective filtered reference value, and to operate the source side converter or at least one of the source side converters in the frequency damping mode in accordance with the or each filtered reference value.

15. The power transmission network according to claim 13 wherein the control system is configured to modulate the active power reference value and/or the reactive power reference value, and to operate the source side converter at least one of the source side converters in the frequency damping mode in accordance with the or each modulated reference value.

16. The power transmission network according to claim 15 wherein the control system is configured to modulate the active power reference value and/or the reactive power reference value, and to operate the source side converter or at least one of the source side converters in the frequency damping mode in accordance with the or each modulated reference value and thereby inject at least one additional frequency component into its AC connecting point and/or the AC transmission link.

17. The power transmission network according to claim 9 wherein the control system is configured to:
operate at least one first source side converter to operate in an AC voltage control mode as an AC slack bus to control a magnitude and/or frequency of an AC voltage of the AC transmission link at a steady-state value, and thereby facilitate variation of a power transfer between the AC and DC connecting points of each source side converter to accommodate a variation in power generated by the variable power source;

operate at least one second source side converter as an active and/or reactive power sink or source; and operate the first source side converter or the second source side converter in the frequency damping mode.

18. The power transmission network according to claim 7 wherein the control system is configured to receive and process at least one electrical measurement of the power transmission network so as to provide at least one modulating signal, the control system being further configured to process the modulating signal to modulate the reference value as a function of the received electrical measurement.

19. The power transmission network according to claim 18 wherein the control system included a cascaded control loop, and the control system is configured to process the or each modulating signal in an inner control loop of the cascaded control loop.

20. The power transmission network according to claim 1 wherein the control system includes a global controller for operating a plurality of converters, at least one local controller for operating at least one converter, or a combination thereof.

21. A method of damping at least one frequency component in a power transmission network, the power transmission network comprising:

a variable power source;

an AC transmission link for AC power transmission from the variable power source to at least one source side converter; and the at least one source side converter including: an AC connecting point operably connected to the AC transmission link; and a DC connecting point for connection to a DC transmission link, wherein the method comprises the step of operating the source side converter or at least one of the source side converters in a frequency damping mode to control an AC voltage at its AC connecting point and thereby damp at least one frequency component at its AC connecting point and/or in the AC transmission link, and wherein the control system is configured to actively modify a magnitude reference value for an AC voltage of the AC transmission link or a frequency reference value for an AC voltage of the AC transmission link, and to operate the at least one source side converter in the frequency damping mode in accordance with the modified reference value.

\* \* \* \* \*